United States Patent
Moore, Jr. et al.

(10) Patent No.: US 7,792,276 B2
(45) Date of Patent: *Sep. 7, 2010

(54) LANGUAGE INTERPRETATION CALL TRANSFERRING IN A TELECOMMUNICATIONS NETWORK

(75) Inventors: James L. Moore, Jr., Carmel, CA (US); Louis Provenzano, Monterrey, CA (US)

(73) Assignee: Language Line Services, Inc., Monterey, CA (US)

( * ) Notice: Subject to any disclaimer, the term of this patent is extended or adjusted under 35 U.S.C. 154(b) by 1348 days.

This patent is subject to a terminal disclaimer.

(21) Appl. No.: 11/226,526

(22) Filed: Sep. 13, 2005

(65) Prior Publication Data

US 2007/0064915 A1    Mar. 22, 2007

(51) Int. Cl.
H04M 3/00    (2006.01)
(52) U.S. Cl. ............... 379/265.12; 379/93.21; 379/158; 379/202.01; 704/2; 704/8
(58) Field of Classification Search ............... 379/93.21, 379/158, 202.01, 203.01, 204.01, 205.01, 379/206.01, 207.01, 212.01, 265.12, 265.07; 704/2, 8, 9
See application file for complete search history.

(56) References Cited

U.S. PATENT DOCUMENTS

| | | | |
|---|---|---|---|
| 4,445,211 A | 4/1984 | Webber | |
| 4,691,347 A * | 9/1987 | Stanley et al. | 379/203.01 |
| 4,882,681 A | 11/1989 | Brotz | |
| 5,136,633 A | 8/1992 | Tejada et al. | |
| 5,353,335 A | 10/1994 | D'Urso et al. | |
| 5,373,549 A * | 12/1994 | Bales et al. | 379/93.21 |
| 5,375,164 A | 12/1994 | Jennings | |
| 5,392,343 A * | 2/1995 | Davitt et al. | 379/265.12 |
| 5,426,706 A | 6/1995 | Wood | |

(Continued)

FOREIGN PATENT DOCUMENTS

EP    0 601 710    6/1994

(Continued)

OTHER PUBLICATIONS

Carey Gillam, "Language Line Gives Guests A Chance To Reach Out Touch A Translator", The Kansas City Business Journal, Aug. 30, 1991, p. 2, vol. 9 No. 50.

(Continued)

Primary Examiner—Olisa Anwah
(74) Attorney, Agent, or Firm—Patent Ingenuity, P.C.; Samuel K. Simpson

(57) ABSTRACT

A method and system of providing language interpretation for a merchant are disclosed. An incoming telephone call from a customer speaking a first language is received at a language interpretation service. The customer is greeted in the first language by an interpreter associated with a language interpretation provider. The interpreter telephonically engages a first agent representing the merchant, wherein the first agent speaks a second language and the interpreter translates a conversation between the customer and the first agent. Once the translation is completed, the first agent is disconnected from the call. Next, if the customer elects to be connected to a business partner of the merchant, the interpreter telephonically engages a second agent representing the business partner. The second agent speaks the second language and the interpreter translates a conversation between the customer and the second agent.

1 Claim, 6 Drawing Sheets

U.S. PATENT DOCUMENTS

| | | | |
|---|---|---|---|
| 5,509,060 A | 4/1996 | Hall et al. | |
| 5,544,229 A | 8/1996 | Creswell et al. | |
| 5,590,186 A * | 12/1996 | Liao et al. | 379/211.02 |
| 5,684,867 A | 11/1997 | Gesslein, Jr. et al. | |
| 5,749,075 A | 5/1998 | Toader et al. | |
| 5,794,218 A | 8/1998 | Jennings et al. | |
| 5,797,092 A * | 8/1998 | Cox et al. | 455/404.1 |
| 5,825,863 A | 10/1998 | Walker | |
| 5,875,422 A | 2/1999 | Eslambolchi et al. | |
| 5,884,246 A | 3/1999 | Boucher et al. | |
| 5,937,051 A * | 8/1999 | Hurd et al. | 379/212.01 |
| 5,953,400 A | 9/1999 | Rosenthal et al. | |
| 5,960,070 A | 9/1999 | O'Donovan | |
| 5,970,124 A | 10/1999 | Csaszar et al. | |
| 5,991,748 A | 11/1999 | Taskett | |
| 6,038,292 A | 3/2000 | Thomas | |
| 6,069,939 A | 5/2000 | Fung et al. | |
| 6,097,806 A | 8/2000 | Baker et al. | |
| 6,115,458 A | 9/2000 | Taskett | |
| 6,134,306 A | 10/2000 | Lautenschlager et al. | |
| 6,161,082 A | 12/2000 | Goldberg et al. | |
| 6,205,215 B1 | 3/2001 | Dombakly | |
| 6,208,851 B1 | 3/2001 | Hanson | |
| 6,227,972 B1 | 5/2001 | Walker et al. | |
| 6,229,879 B1 | 5/2001 | Walker et al. | |
| 6,246,755 B1 | 6/2001 | Walker et al. | |
| 6,263,058 B1 | 7/2001 | Lautenschlager et al. | |
| 6,289,088 B1 | 9/2001 | Bruno et al. | |
| 6,292,769 B1 | 9/2001 | Flanagan et al. | |
| 6,301,566 B1 | 10/2001 | Costello | |
| 6,337,903 B1 | 1/2002 | Manner | |
| 6,363,411 B1 | 3/2002 | Dugan et al. | |
| 6,381,316 B2 | 4/2002 | Joyce et al. | |
| 6,597,765 B1 | 7/2003 | Ksiazek | |
| 6,665,387 B2 | 12/2003 | Hannu | |
| 6,690,932 B1 * | 2/2004 | Barnier et al. | 455/414.1 |
| 6,760,411 B2 | 7/2004 | Dybedokken et al. | |
| 6,801,602 B2 | 10/2004 | Glossbrenner | |
| 6,826,269 B2 | 11/2004 | Afana | |
| 6,856,674 B1 | 2/2005 | De Trana et al. | |
| 6,907,256 B2 | 6/2005 | Hokao | |
| 6,920,487 B2 | 7/2005 | Sofer et al. | |
| 6,963,557 B2 | 11/2005 | Knox | |
| 6,999,758 B2 | 2/2006 | Pence et al. | |
| 7,006,604 B2 | 2/2006 | Engelke | |
| 7,068,668 B2 | 6/2006 | Feuer | |
| 7,184,539 B2 | 2/2007 | Colson et al. | |
| 7,307,651 B2 | 12/2007 | Chew | |
| 7,376,415 B2 * | 5/2008 | Surette | 455/418 |
| 7,539,296 B2 | 5/2009 | Basson et al. | |
| 2001/0032878 A1 | 10/2001 | Tsiounis et al. | |
| 2001/0034599 A1 | 10/2001 | Kage et al. | |
| 2001/0051514 A1 | 12/2001 | Lindholm | |
| 2002/0046035 A1 | 4/2002 | Kitahara et al. | |
| 2002/0069048 A1 | 6/2002 | Sadhwani et al. | |
| 2002/0069067 A1 * | 6/2002 | Klinefelter et al. | 704/270.1 |
| 2002/0097854 A1 | 7/2002 | Bauer | |
| 2002/0136381 A1 | 9/2002 | Shaffer et al. | |
| 2002/0152063 A1 | 10/2002 | Tokieda et al. | |
| 2002/0169592 A1 | 11/2002 | Aityan | |
| 2002/0181669 A1 | 12/2002 | Takatori et al. | |
| 2003/0008639 A1 | 1/2003 | Kanegae | |
| 2003/0013438 A1 | 1/2003 | Darby | |
| 2003/0095542 A1 | 5/2003 | Chang et al. | |
| 2003/0144912 A1 | 7/2003 | McGee | |
| 2003/0149557 A1 | 8/2003 | Cox et al. | |
| 2003/0154122 A1 | 8/2003 | Jackson, Jr. et al. | |
| 2003/0158722 A1 | 8/2003 | Lord | |
| 2003/0163300 A1 | 8/2003 | Kasvand et al. | |
| 2003/0208352 A1 * | 11/2003 | Lee | 704/2 |
| 2004/0014462 A1 | 1/2004 | Surette | |
| 2004/0017897 A1 * | 1/2004 | Engelke | 379/52 |
| 2004/0092293 A1 | 5/2004 | Lee et al. | |
| 2004/0096050 A1 | 5/2004 | Das et al. | |
| 2004/0128139 A1 | 7/2004 | Ilan et al. | |
| 2004/0165579 A1 | 8/2004 | Mandle | |
| 2004/0218737 A1 * | 11/2004 | Kelly | 379/88.18 |
| 2004/0267538 A1 | 12/2004 | Obuchi et al. | |
| 2005/0084078 A1 | 4/2005 | Miller et al. | |
| 2005/0122959 A1 | 6/2005 | Ostrover et al. | |
| 2005/0129215 A1 | 6/2005 | Parker | |
| 2005/0149335 A1 | 7/2005 | Mesbah et al. | |
| 2005/0152530 A1 | 7/2005 | Pence et al. | |
| 2005/0209859 A1 | 9/2005 | Tenembaum et al. | |
| 2005/0216252 A1 | 9/2005 | Schoenbach et al. | |
| 2005/0251421 A1 | 11/2005 | Chang et al. | |
| 2005/0261890 A1 | 11/2005 | Robinson | |
| 2005/0272414 A1 * | 12/2005 | Vallarino | 455/417 |
| 2006/0023869 A1 | 2/2006 | Reynolds et al. | |
| 2006/0026001 A1 | 2/2006 | Bravin et al. | |
| 2006/0126821 A1 | 6/2006 | Sahashi | |
| 2006/0165225 A1 * | 7/2006 | Sahashi | 379/67.1 |
| 2007/0041370 A1 | 2/2007 | Cleveland | |
| 2007/0050306 A1 | 3/2007 | McQueen | |
| 2007/0064913 A1 * | 3/2007 | Shaffer et al. | 379/265.02 |
| 2007/0064915 A1 | 3/2007 | Moore et al. | |
| 2007/0064916 A1 | 3/2007 | Moore et al. | |
| 2007/0071181 A1 | 3/2007 | Hwang | |
| 2007/0121903 A1 | 5/2007 | Moore et al. | |
| 2008/0049929 A1 | 2/2008 | Miloslavsky et al. | |
| 2008/0095355 A1 | 4/2008 | Mahalaha et al. | |
| 2008/0205629 A1 | 8/2008 | Basson et al. | |
| 2008/0240388 A1 | 10/2008 | Surette | |
| 2009/0190748 A1 | 7/2009 | Chishti et al. | |
| 2010/0026339 A1 | 2/2010 | Koo | |

FOREIGN PATENT DOCUMENTS

| | | |
|---|---|---|
| EP | 1 041 801 A2 | 10/2000 |
| EP | 1 545 110 | 6/2005 |
| EP | 1 545 111 | 6/2005 |
| JP | 2001 313721 | 11/2001 |
| JP | 2002 073783 | 3/2002 |
| JP | 2002 142024 | 5/2002 |
| JP | 2002 152387 | 5/2002 |
| JP | 2002 163400 | 6/2002 |
| JP | 2002 237897 | 8/2002 |
| JP | 2002 244842 | 8/2002 |
| JP | 2003 069720 | 3/2003 |
| JP | 2003 110702 | 4/2003 |
| JP | 2003 234833 | 8/2003 |
| JP | 2004 023262 | 1/2004 |
| JP | 2004 260430 | 9/2004 |
| JP | 2005 286979 | 10/2005 |
| RU | 2 143 135 C1 | 12/1999 |
| WO | WO 2004/030330 | 4/2004 |

OTHER PUBLICATIONS (author not indicated), "The Phone Call That Speaks Your Language", Money magazine, Jun. 1991, p. 32, vol. 20 No. 6.

(author not indicated), "News and Reports—AT&T Language Line", Managing Service Quality, 1995, vol. 5 No. 1.

(author not indicated), "NHS Direct Translator—National Health Services", Chemist & Druggist magazine, Sep. 25, 2004.

Blayne Cutler, "Multilingual Marketers Work For The Police", American Demographics, Jan. 1992, p. 10, vol. 14 No. 1.

(author not indicated), "Telephone Translators Covered In Deal Between SSH And California Company", Hospital Materials Management, Jun. 2002.

Frederick Gabriel, "Providers Say 'Ah', 'Ay' and 'Oy'—Health Care Providers Which Treat Non-English Patients Must Contend With Cultural and Linguistic Challenges", Crain's New York Business, Jan. 26, 1998, 14(4):30.

Brendan B. Read, "Gracias Por Llamar (Thank You for Calling)", Call Center Magazine, Oct. 2003, p. 32, vol. 16 No. 10.

Phil Zinkewicz, "In Any Other Language—Translators Handle Emergency Calls or Business/Industry Needs", Insurance Advocate, Mar. 8, 2004, p. 2.

Language Lines Services, "Language Line Services Tutorial".

Language Line Services, "Commonly Asked Interpretation Questions And Answers", Jun. 22, 2004.

Language Line Services, "Over-The-Phone Language Interpretation . . . How Does That Work Exactly?", http://www.languageline.com/prod_serv_interp.php, 2 pages.

Tele-Interpreters, "Tele-Interpreters On-Call", http://web.archive.org/web/19990128224906/http://www.teleinterpreters.com/, 8 pages.

Tele-Interpreters, "Over-The-Phone Language Interpretation Services", http://www.teleinterpreters.com/otp_interpretation_services.aspx, 3 pages.

Network Omni, "On-Demand And Global OPI Services. 24/7/365 in 150 Languages", http://www.networkomni.com/opi-offering.asp, 2 pages.

Network Omni, "Translating on Demand in 140 Languages", http://web.archive.org/web/20000308070011/www.networkomni.com/TranslationLine.html, 2 pages.

* cited by examiner

LANGUAGE INTERPRETATION CALL TRANSFERRING IN A TELECOMMUNICATIONS NETWORK

BACKGROUND OF THE DISCLOSURE

1. Field of the Disclosure

The present disclosure relates generally to offering language interpretation services. In particular, the present disclosure relates to providing language interpretation services in a telecommunications network.

2. General Background

Modern telecommunications systems permit international multilingual communication which in turn is based on effectively communicating in a common language. Many businesses increasingly depend on global commerce, specifically on goods and services flowing freely and clearly. An integral part of business transactions is oral communication that is understood immediately. Often, however, the customer and the business do not speak the same language which hinder communication. In order to provide better service and improve commercial transactions with customers, many businesses subscribe to translation services to perform such necessary translation.

It has become common practice among companies to engage in agreements with other businesses offering complementary products and services. These partnership programs are offered via an array of channels, one of the more common transfers the customer to partner customer service centers who offer the customer additional related choices and options.

Situations commonly arise when language translation is needed on an ad-hoc basis, such as when a business receives a call from someone speaking a different language, a language translator is procured, and then the call is transferred to another business, a business partner. When the customer is a non-English speaker, transferring calls from one business to another typically implies disconnecting the translation service as well. Furthermore, after the call is disconnected, the customer generally does not call on his own accord to the business partner. This results in lost revues for both business partners because the first company does not receive a referral fee, and the second company loses the opportunity to obtain another customer.

SUMMARY

In one aspect, there is a method of providing language interpretation for a merchant. An incoming telephone call from a customer speaking a first language (e.g. Spanish, Chinese) is received at a language interpretation service. The customer is greeted in the first language by an interpreter associated with a language interpretation provider. The interpreter telephonically engages an agent representing the merchant, wherein the agent speaks a second language (e.g. English) and the interpreter translates a conversation between the customer and the agent. The agent can be thereafter disconnected from the call. If the customer elects to be connected to a business partner of the merchant, the interpreter telephonically engages a second agent representing the business partner. The second agent speaks the second language and the interpreter translates a conversation between the customer and the second agent. The conversation between the customer and the agent can relate to a business transaction between the customer and the agent.

The language interpretation services billing to the merchant starts when the agent representing the merchant is connected to the call with the interpreter and the customer. Furthermore, the language interpretation services billing to the merchant stops when the agent representing the merchant is disconnected from the call with the interpreter and the customer. Language interpretation services billing to the business partner starts when the second agent representing the business partner is connected to the call with the interpreter and the customer. In addition, language interpretation services billing to the business partner stops when the second agent representing the business partner is disconnected from the call with the interpreter and the customer.

A telephone number can be configured to be a language assistance number for the merchant, wherein incoming calls to the telephone number are routed to an interpreter. The number can be a toll-free number.

The incoming call can be first received by a private branch exchange that routes the call to the interpreter, the interpreter being located remotely from the business facilities of a language interpretation provider. The interpreter can be provided with equipment to receive voice and data information related to the customer.

In another aspect, a business partner network can be provided to the merchant, wherein the merchant is part of the business partner network. The incoming telephone call is received from a customer by an automated system provided by the merchant. The automated system forwards the incoming telephone call to the language interpretation provider if language interpretation is required. The incoming call is forwarded to the language interpretation provider is then relayed to the interpreter. The incoming telephone call is relayed to the language interpretation provider by configuring the automated system to dial a signal to the carrier so that the incoming telephone call connection to the merchant is released, the carrier routing the incoming telephone call to the language interpretation provider.

In another aspect, the incoming telephone call from a customer is received by an automated system provided by the carrier. The automated system forwards the incoming telephone call to a language interpretation provider if language interpretation is required. The incoming call forwarded to the language interpretation provider is relayed to the interpreter. The carrier can be contracted to provide call routing service such that when the customer requests language interpretation service the call is routed to a language interpretation provider, and when the customer does not need language interpretation service the call is routed to a regular customer service center.

In one aspect, there is a system for providing language interpretation for a merchant. A language interpretation service receives an incoming telephone call from a customer speaking a first language. The customer being greeted in the first language by an interpreter associated with the language interpretation provider. The interpreter is provided with equipment that permits to telephonically engage an agent representing the merchant. The agent speaks a second language and the interpreter translates a conversation between the customer and the agent. The equipment provided to the interpreter further permits the interpreter to disconnect the agent from the call. If the customer elects to be telephonically connected to a business partner of the merchant, the equipment further permits the interpreter to telephonically engage a second agent representing the business partner. The second agent speaks the second language and the interpreter translates a conversation between the customer and the second agent.

DETAILED DESCRIPTION

A method and system to permit a company to transfer a customer call to another company while at the same time maintaining customer language interpretation is disclosed. Modern companies engage in agreements with other companies that offer complementary products and services. As part of these agreements, customer telephone calls are transferred from one customer center to that of the complementary company. When the customer is a limited English proficiency (LEP) caller, and an interpreter is on the line with the first company, the second company would benefit from receiving the call with the customer and the interpreter on the line. Unfortunately, this option is not available since it has been technologically impossible to transfer the customer and interpreter between companies due to call billing procedures. The method and system described herein permit calls to be billed to the company using the phone line and the interpreter time. Thus, once a call is transferred, the company that disengaged the customer stops incurring costs, while the company that engaged the customer starts incurring interpretation costs.

This system and method permits non-English speaker customers to be handled in the same way as English speaking callers, thus providing partner companies the opportunity to expand their customer base and to significantly increase revenue. Furthermore, revenue potential is also increased because non-English speaker customers are much more likely to remain on the line and conduct business with other businesses offering in-language services when the interpreter remains on the call.

A company using this method will further benefit by having a database of names of companies subscribing to this service, such as a listing of other companies offering complementary goods and service who are also partners. The companies subscribed to the service do not have to pay a transfer fee, and the call transfer between companies appears seamless to the customer.

In a parallel example, an English-speaking caller to an airline is often offered the option of having the call transferred to a car rental company call center once the caller has completed all airline related concerns. If the customer accepts the transfer, the process benefits all of the parties involved. The airline benefits from a referral fee paid by the car rental company. The car rental company benefits from the contact with a receptive customer in need of car rental services. Finally, the customer benefits from reducing the complexity of the travel-planning process.

Figure 1A:
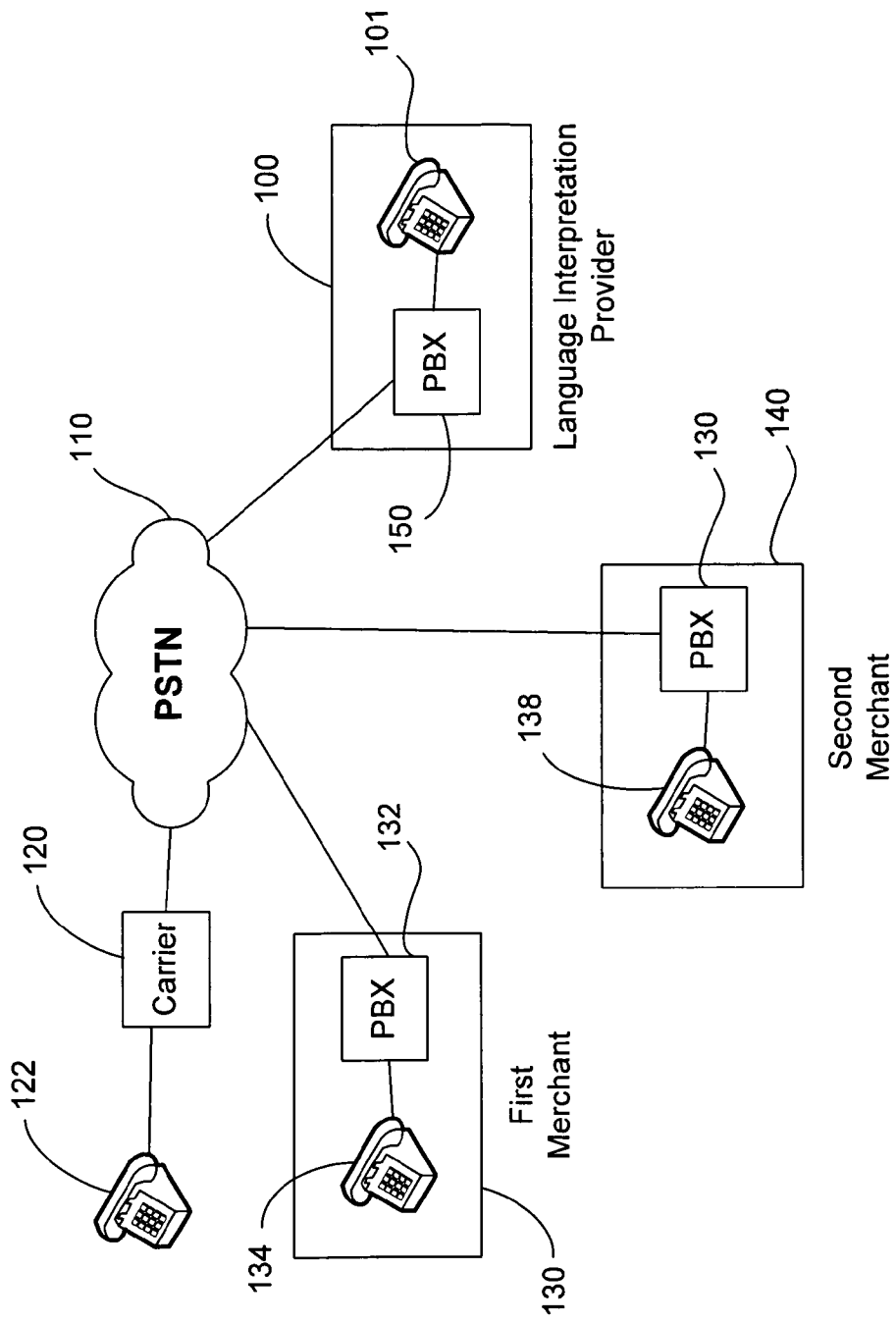
FIG. 1A illustrates a component diagram of a language interpretation service in a communications network.

FIG. 1A illustrates a component diagram of a language interpretation service in a communications network. The communications network allows a limited-English-proficiency caller 122 to make a phone call through a public switch network 110 to a first merchant 130 in order to conduct business. A language interpretation provider 100 assists the LEP caller 122 to transact business with the first merchant 130 by providing language interpretation services from the LEP caller 122 and the first merchant 130.

Once the transaction with the first merchant 130 has finished, the LEP caller 122 can be transferred to a second merchant 140 through the public switch network 110. When a LEP caller 122 calls the first merchant 130, the call from the LEP caller 122 can be routed through a carrier 120 connected to the public switch network 110. Depending on the configuration of the language interpretation provider 100, the carrier 120 can route the phone call either directly to the first merchant 130 or to the language interpretation provider 100. If the call is routed to the language interpretation provider 100, the interpreter 101 can receive the phone call from the LEP caller 122 and such phone call can be routed through a primary private branch exchange 150. After the call is routed to the language interpretation provider 100, the phone call can be connected through the public switch telephone network 110 to the merchant customer service of the first merchant 130 through a corresponding private branch exchange 132 and be connected to a customer service representative 134 working for first merchant 130.

After the LEP caller 122 finishes the transaction, the interpreter 101 can keep the LEP caller 122 on the line and facilitate a second merchant 140 to transact further business with the LEP caller 122. The phone call can be routed to the second merchant 140 through a private branch exchange 136 to the customer service representative 138 which can be an employee of the second merchant 140. In one embodiment, the first merchant 130 and the second merchant 140 are business partners such that when a phone call is received by the first merchant 130, the first merchant 130 can be able to offer services that are complemented or supplemented by the services or the products provided by the second merchant 140.

Figure 1B:
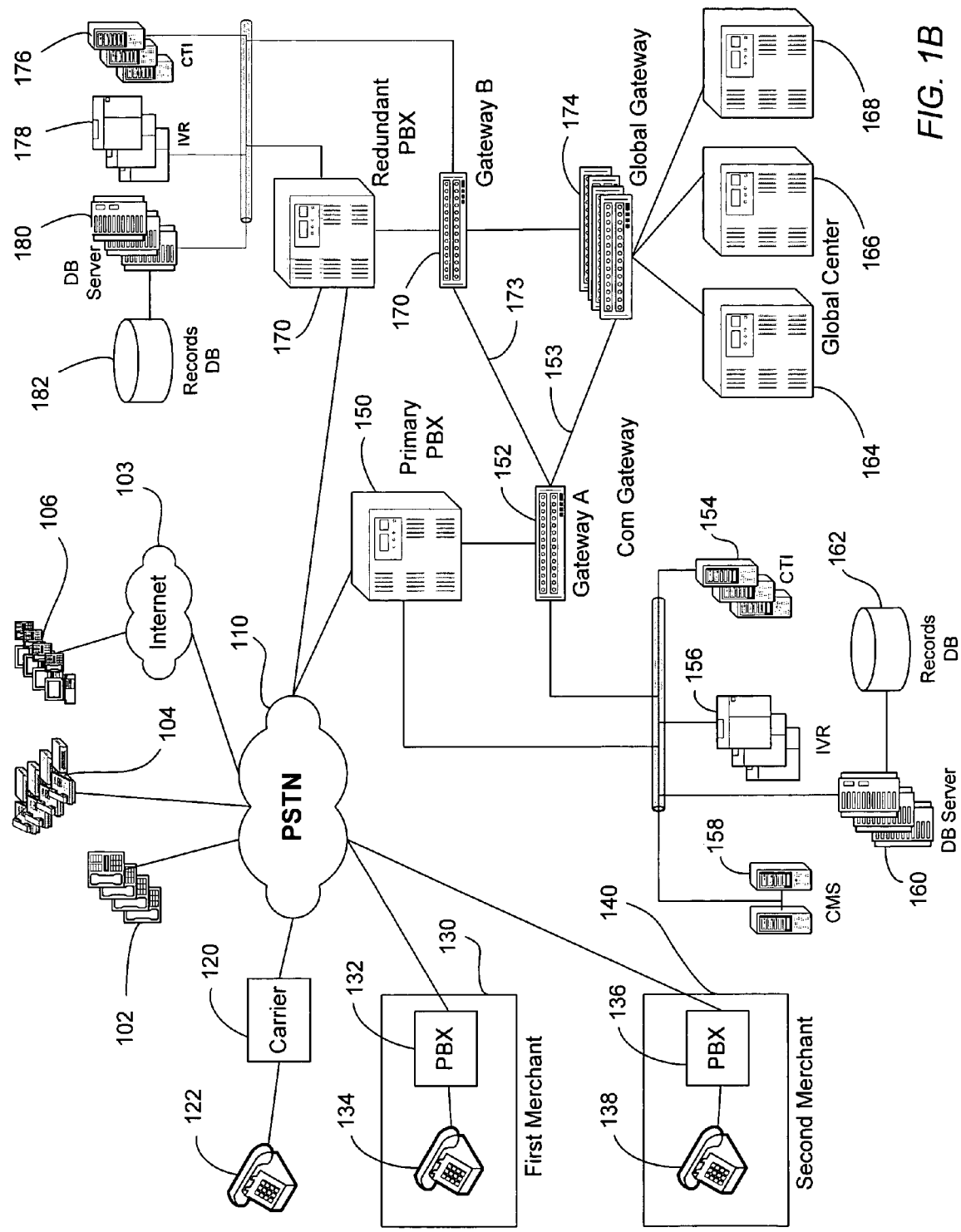
FIG. 1B illustrates an exploded component diagram of a language interpretation service in a communications network.

FIG. 1B illustrates an exploded component diagram of a language interpretation service in a communications network. The language interpretation provider 100 can be equipped with redundant private branch exchange 170. As such, the language interpretation provider 100 can have at least two call centers that can provide service to incoming calls that need language translation.

In one embodiment, the primary private branch exchange 150 can receive all the direct incoming phone calls from LEP callers 122 or calls routed from LEP callers 122, from the first merchant 130. The primary PBX then services the phone calls by connecting the interpreter 101 that can allow the LEP caller 122 to conduct business with the first merchant 130. In another embodiment, if the primary private branch exchange 150 is saturated with phone calls, or is unable to handle a call volume received, the redundant private branch exchange 170 can take all calls routed to the private branch exchange 150. The redundant private exchange 170 can also receive some of the calls that the primary private branch exchange 150 is not able to handle.

Once the incoming call is received, the primary private branch exchange 150 works as the call center environment wherein depending on the number dialed by the LEP caller 122 and other information provided by the LEP caller 122 the phone call can be routed to the destination. The primary private branch exchange 150 and the redundant private branch exchange 170 are connected to the public switch network 110 through an optical carrier 3 (OC3) line or similar facilities. In one embodiment, the OC3 line can have a capacity of 155.52 megabits per second.

In another embodiment, the primary private branch exchange 150 is connected to a communications gateway 152 which works as a hub and router of calls handled by the primary private branch exchange 150. The communication gateway 152 can also have the capability of compressing voice and data associated with the incoming phone call from the LEP caller 122. Thus, the data transmitted out of the communication gateway 152 is sampled down to smaller data packages thus limiting the occupation time of the telephone network, thereby reducing costs associated with transmission of data. The communication gateway 152 can, for example, be implemented by the use of a Multiservice Media Gateway box which has the capability of voice and data compression as well as call routing.

In one embodiment, the private branch exchange 150 and the communication gateway 152 are communicated to a plurality of services that allow for communications support. For example, a computer telephony integration system 154 permits communication through the communication gateway 152 and serves to manipulate and route incoming and outgoing phone calls. The computer telephony integration system 154 collects data pertaining to the incoming and outgoing calls. This data can be, for example, caller information, automatic number identification (ANI), time and date when the phone call was started, time and date when the phone call ended, the total number of minutes, associated third parties connected to the phone call, etc. Call and customer information received and processed by computer telephony integration system 154 can then be relayed to a database server 160 which then stores all the information in a records database 162.

In another embodiment, the primary private branch exchange 150 utilizes is the interactive voice response system 156. The interactive voice response system 156 automatically responds to the incoming phone calls from LEP caller 122 and can provide a language interpretation option as well as other options that can allow the LEP caller 122 to customize the circumstances of the call. The data collected by the interactive voice response system 156 can be relayed to provide a description to the merchant of what kind of service the LEP caller 122 is requesting. Finally, a call metrics server 158 collects data that is recorded also in the records database 162. The call metrics server 158 collects data regarding volume and statistical analysis for such data as the number of interpreters available, current speed of answer, number of phone calls on hold, number of phone calls made within a certain time period, etc.

In another embodiment, the collected statistical information and analysis can be utilized by the computer telephony integration system 154 which, in turn, can report back to interactive voice response system 156. In a mirror-like fashion, the redundant private branch exchange 170 includes similar components that are connected to the redundant private branch exchange 170. For example, the redundant private branch exchange 170 is connected to a communications gateway 172 which also allows for data compression and voice compression and for routing calls to an international global gateway 174 or back to the communication gateway 152. The redundant private branch exchange 170 also has a multiplicity of services that allow the redundant private branch exchange 170 to receive incoming phone calls, process them and reroute them to the designated specific language interpreter 101. Thus, the redundant private branch exchange 170 can be connected to a computer telephony integration system 176, to an interactive voice response system 178, and to a database server 180 which in turn has access to a records database 182. In another embodiment, the redundant private branch exchange 170 is also connected to the call metrics server collocated with the primary private branch exchange 150.

In yet another embodiment, the communication gateway 152 as well as the communication gateway 172 can communicate to global gateway 174 through an international private line 153. The international private line 153 can be a T1 private line (e.g. PSAX 8 kilobytes voice). The global gateway 174 can be placed in a different country from where the primary private branch exchange 150 and the redundant private branch exchange 170 are located. This allows the language interpretation provider 100 to grow globally and have global centers 164, 166, and 168 in other parts of the world thus allowing the language interpretation provider 100 to service a greater number of languages serviced. Because a global center can be located in a specific country where the communication skills and language knowledge base are better, the language interpretation provider 100 can provide a vast array of language interpretation without having to train interpreters 101 connected to a North America primary private branch exchange 150. Yet another positive aspect of having global centers 164, 166, and 168 is that the costs for language interpretation services can be reduced since the local wages can be lower. As such, the concentration of native speakers in each country increases the pool of talent making the language interpretation provider 100 flexible to service a greater number of LEP callers 122.

For example, global centers can be placed in the Dominican Republic, Costa Rica, and Panama. Each of these global centers can include a plurality of employees fluent both in English and Spanish. The global centers 164, 166, and 168 can permit the data to be transmitted from one of the local global centers at which the interpreter 101 is located to the global gateway 174, and to the primary private branch exchange 150. The call is then carried through the public switch network and to the LEP caller 122 as well as the customer representative 134 or the customer representative 138 depending on which merchant is connected. In another embodiment, the number of global centers can vary such that the size of the language interpretation provider 100 increases by simply scaling up the number of global centers located in each of the localities around the world. The interpreter 101 services can also be provided directly from North America and do not have to be localized in different countries.

In another embodiment, a single line analog interpreter 102 can be communicated directly through the public switch telephone network 110 so that when the incoming call is received by the primary private branch exchange 150, the call is rerouted to the single line remote interpreter 102. Typically, the single line interpreter 102 can work through utilizing voice. In another embodiment, a remote interpreter 101 that is not located at the place of business of the language interpretation services can also be located at his home and can, for instance, be located at, or communicated through, a digitally extended business phone 104. The digitally extended business phone 104 provides voice-only communication and allows for remote identification. As such, the call is routed to a digitally extended business phone 104 through the primary private branch exchange 150, and makes it appear to the other entities within the communication network as if the telephone number and the remote worker would be working at the place of business of the language interpretation provider 100.

In yet another embodiment, the remote worker 106 can be connected via broadband such that the remote worker 106 can be connected to either the internet 108 or a virtual private network (VPN) in order to provide voice services and data. The capability of broadband allows the interpreter 101 to receive audio through the voice channel as well as data. Data received by the interpreter 106 include such data as written text or other necessary information that can permit the interpreter 101 to read written text and images to be more helpful to the LEP caller 122. For example, when the LEP caller 122 tries to make a reservation, the remote call worker 106 can have the same information (e.g. a website) that the customer service representative 124 has in his computer monitor. Therefore the remote worker 106 can better assist the LEP caller 122 because the remote worker 106 has instant access at his computer thus permitting the LEP caller 122 to be informed about data that the LEP caller 122 can otherwise not be able to read.

Figure 2:
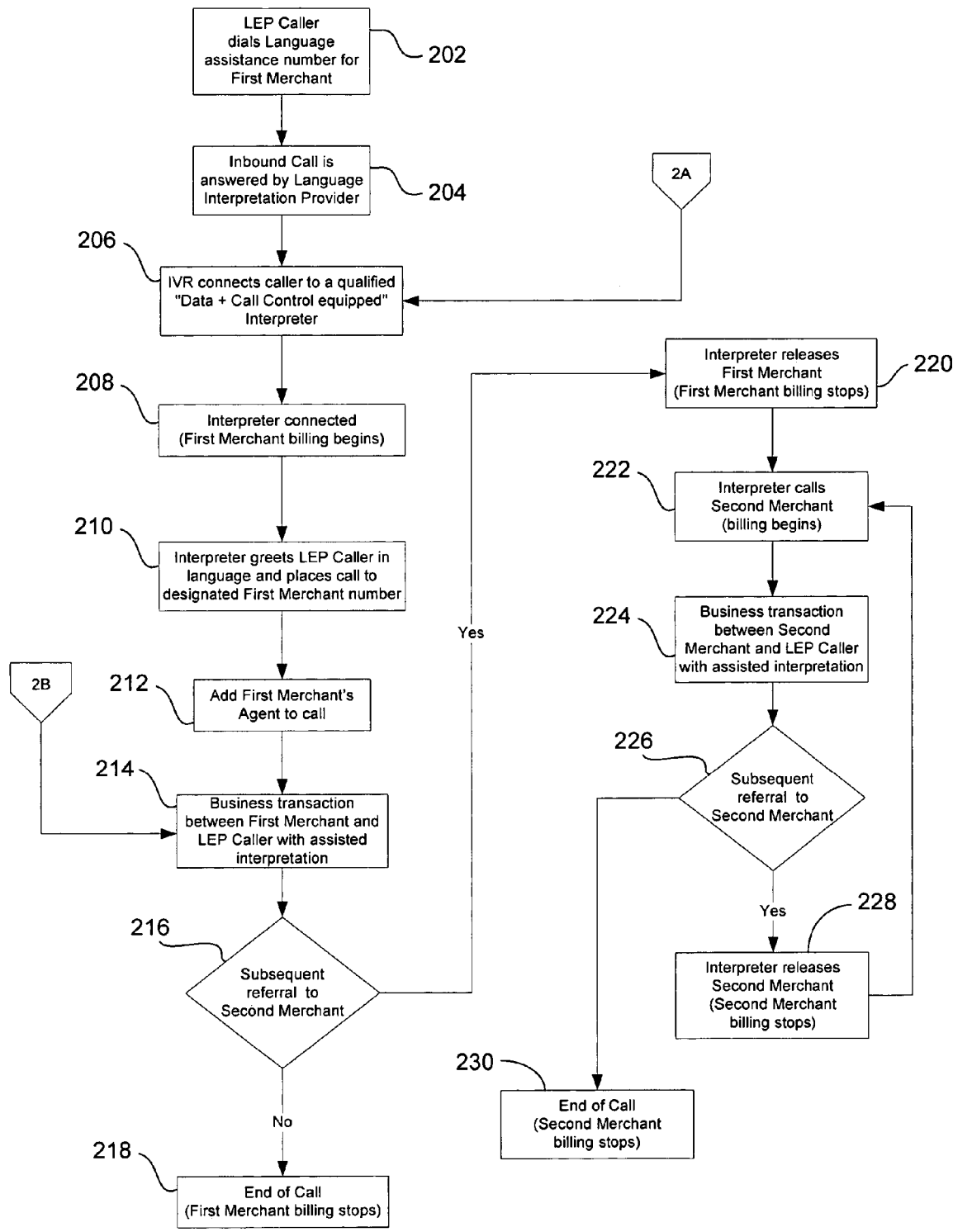
FIG. 2 illustrates a call flow diagram wherein the customer calls a first merchant's language-specific telephone number.

FIG. 2 illustrates a call flow diagram wherein a customer calls a first merchant's language specific telephone number. In process block 202, the LEP caller 122 dials a language assistance telephone number for the first merchant 130. The LEP caller 122 dials the language assistance number in order to receive customer service assistance in the language that is requested by the LEP caller 122. In one embodiment, the first merchant 130 provides a toll-free number for each different available language that a potential LEP caller 122 would need. In another embodiment, the first merchant 130 can provide a toll-free number for any non-English language to be provided for interpretation and to assist customers such as the LEP caller 122.

In process block 202, the call is received by the language interpretation provider 100. As such, the inbound call received in process block 204 can be received at primary private branch exchange 150. The call is then rerouted to an interpreter 101 who answers the call in the language assigned to the toll-free number. In one embodiment, the interpreter 101 can be provided with a specific signal (e.g. audio) indicating the business name of the first merchant 130, or the originating telephone number. As such, the interpreter 101 can serve multiple merchants. With the appropriate signal received, the interpreter 101 can then greet the inbound call appropriately. For example, if the LEP caller 122 calls a designated number for a car rental company, the language interpretation provider 100, not the car rental company receives the phone call. The interpreter 101, for example, can receive the dialed number and the corresponding name of the business associated with the dialed number.

Next, in process block 206 the interactive voice response connected to the primary private branch exchange 150 leads the LEP caller 122 through a series of questions that requires the input of at least one keystroke on the telephone handset. In one embodiment, the interactive voice response system 156 can request the customer to say the language that the customer requires or would utilize to conduct a business transaction with the first merchant 130. After the information is gathered from the LEP caller 122, the interactive voice response system 156 can connect the caller to the interpreter 101. In another embodiment, the interpreter 101 has a telephone connection to receive data plus control information so that the interpreter 101 can best provide service to the LEP caller 122.

In process block 208 the first merchant 130 billing begins. After the interpreter 101 has been connected, the services of interpretation start running for the benefit of first merchant 130. The interpretation time is charged to the first merchant 130 as soon as the interpreter 101 is connected. Then in process block 210 the interpreter 101 upon being connected greets the LEP caller 122. Because the interpreter 101 knows that the LEP caller 122 is a caller requiring the specific language that the interpreter 101 is qualified to provide, the interpreter 101 can immediately assume that the call can be conducted in the language the interpreter 101 is qualified to interpret. The interpreter 101 then requests information from the LEP caller 122 as to what type of service the LEP caller 122 requires. If the data received by the interpreter 101 indicates that the customer or that the LEP caller 122 requested specific service, then the interpreter 101 does not need to request the LEP caller 122 to provide any further information. For example, the LEP caller 122 can tell the interpreter 101 that the LEP caller 122 is calling to inquire about signing up for new service. However, if in process block 206 the interactive voice response system 156 prompted the LEP caller 122 with the question of whether new service is required or not, and the LEP caller 122 affirmed that new service is required, then such information can be relayed directly to the interpreter 101. The information is related through previously provided equipment to the interpreter 101 so that the interpreter 101 is then on notice that the LEP caller 122 requires new service. If the agent of the first merchant 130 is English speaking only, the interpreter 101 can interpret the business transaction between the English-speaking agent and the LEP caller 122.

In process block 212, the first merchant 130's agent is added to the call thus effectively initiating a three-way call in which the interpreter 101 and the LEP caller 122 were initially connected, and the first merchant 130's agent was added later. In process block 214 the business transaction between the first merchant 130's agent and the LEP caller 122 is conducted. This business transaction is a possible because of the interpretation services that the interpreter 101 provides.

In one embodiment, the language spoken by the first merchant 130 can be English, Spanish, or any other language that is official to the first merchant 130. The language being interpreted is, of course, the language required by the LEP caller 122 to conduct business with the first merchant 130. For instance, the caller 122 can be a caller proficient in English requesting interpretation from another language to English, where the business speaks a language other than English.

For example, the business can be a Korean airline and provides services in Korean. An English-speaking caller requesting access to Korean services can call the language interpretation provider 100. Interpretation provider 100 can then connect the call to the interpreter 101 so that the interpreter 101 can interpret Korean with the first merchant 130 and English with the LEP caller 122. In this case, of course, the caller does not necessarily have a limited English proficiency, but rather, the caller cannot be proficient in Korean language.

In decision block 216 after the business transaction has been conducted with the first merchant 130, the LEP caller 122 asked as to whether a subsequent referral to a partner or a second merchant 140 is required. In one embodiment the second merchant 140 is a partner of the first merchant 130 that provides supplementary or complementary businesses, services and products to the first merchant 130. Examples of supplementary services can be a rental car agency a partner in a supplementary service to an airline reservation system or a hotel reservation system.

If the LEP caller 122 decides to request a referral to a second merchant 140, at process block 220 the interpreter 101 releases the first marriage and 130 from the three-way call taking place between the interpreter 101, the first merchant 130, and the LEP caller 122. As soon as the interpreter 101 releases the first merchant 130 from the call the first merchant 130 billing stops. On the other hand, if the LEP caller 116 does not request a subsequent referral to a second merchant 140, the first merchant 130 billing stops and the call is ended.

In process block to 222, the interpreter 101 calls the second merchant 140. As soon as the call is connected, the billing for interpretation starts accruing in the account of the second merchant 140. Next in process block to 224 the business transaction between the second merchant 140 and the LEP caller 122 is conducted. The business transaction is connected with the assisted interpretation of interpreter 101. At the decision block to 226, a subsequent referral to a third merchant is asked of the LEP caller 122. The LEP caller 122 may decide to request a new merchant depending on the business need of the LEP caller 122. For instance, the LEP caller 122 may decide that he needs services supplementary to the services just provided by the second merchant 140. Examples of supplementary services can be hotel reservation systems and airline reservation systems. A third supplementary service to be provided could be, for example, a car rental service. Many other combinations of business partnerships exist where each business partner provides supplementary products or services to the other business partner. If the LEP caller 122 decides to request a third merchant, at process block 228, then the interpreter 101 releases connection with the second merchant 140 from the phone call and the second merchant billing stops. At that point, the interpretation services for the second merchant 140 have finished and the second merchant 140 will no longer be charged for any other interpretation services. After process block 228, the interpreter 101 calls the next merchant that will provide services to the LEP caller 122. Finally if the LEP caller 122 decides at decision block 226 that no further referrals to a merchant are necessary, the call has ended and process block 230 the interpreter 101 ends the call at process block 230 and therefore the billing for the second merchant 140 stops.

Figure 3:
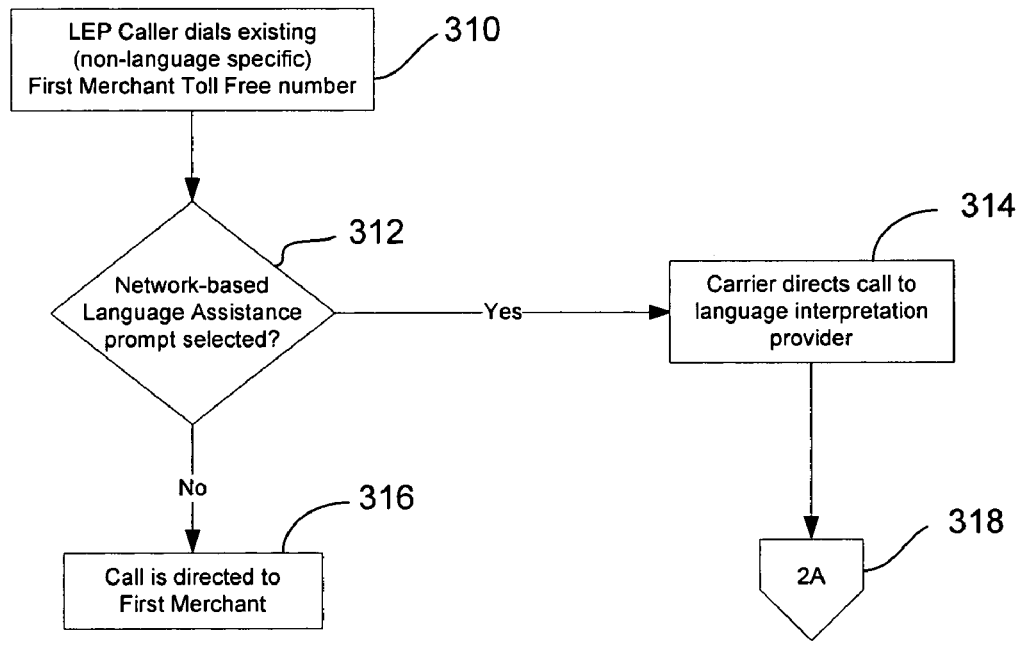
FIG. 3 illustrates a call flow diagram wherein the customer calls a first merchant's non-language-specific telephone number and a carrier-based prompt is utilized.

FIG. 3 illustrates a call flow diagram wherein the customer calls the first merchant's 130 non-language-specific telephone number and the carrier-based prompt is utilized. At process block 310, an LEP caller 122 dials an existing toll-free number. The toll-free number is a non-language specific toll-free number that routes the call directly to the first merchant 130. A call to the toll-free number is first routed to the public switch network 110, and then to the interpreter 101. Because the toll-free number is not language specific, the phone call can be answered in the language that can be the business language for the first merchant 130, for example English.

At decision block 312, a network-based language assistant prompt allows the LEP caller 122 to select whether the call should be interpreted for a particular language or just directly sent to the first merchant 130 customer center. As such, the incoming call received through the toll-free number for the first merchant 130 is first monitored and received by the carrier 120 that services the toll-free number dialed by the LEP caller 122. At decision block 312, when the incoming call comes in at the carrier 120, the carrier 120 can handle the call utilizing a well-known service called network-based-prompting. In order for the call to be handled by the network-based-prompting, the first merchant must subscribe for this service with the carrier 120. The network-based language assistant prompt is a service generally provided by telecommunications carriers such as AT&T, MCI or Sprint that allows a phone call to be routed to the businesses private branch exchange 132 or to another private branch exchange depending on the specifications and needs of the user.

In one embodiment, the network-based prompting can be utilized such that it is configured to have an option for interpretation and a second option for non-interpretation. In another embodiment, the network based prompting can have multiple options for different languages that the LEP caller 122 requires. At decision block 312, if the LEP caller 122 requires language assistance, then the incoming call is routed from the carrier 120 to the language interpretation provider 100 at block 314. Then, at block 318 the call is rerouted to the language interpretation provider 100 and the call flow can continue as explained in FIG. 2 at process block 206.

In another embodiment, the LEP caller 122 is prompted, at process block 310, with the option of language assistance and non-language assistance at decision block 312, and the LEP caller 122 chooses non-language assistance. Then, the call can be directly routed to customer service at the first merchant 130 at process block 316. When the call is routed to such customer service, the call is handled exactly as it would be for any other customer that does not require language translation assistance. A typical carrier that provides network-based prompting is AT&T, MCI, or Sprint, among others.

Figure 4:
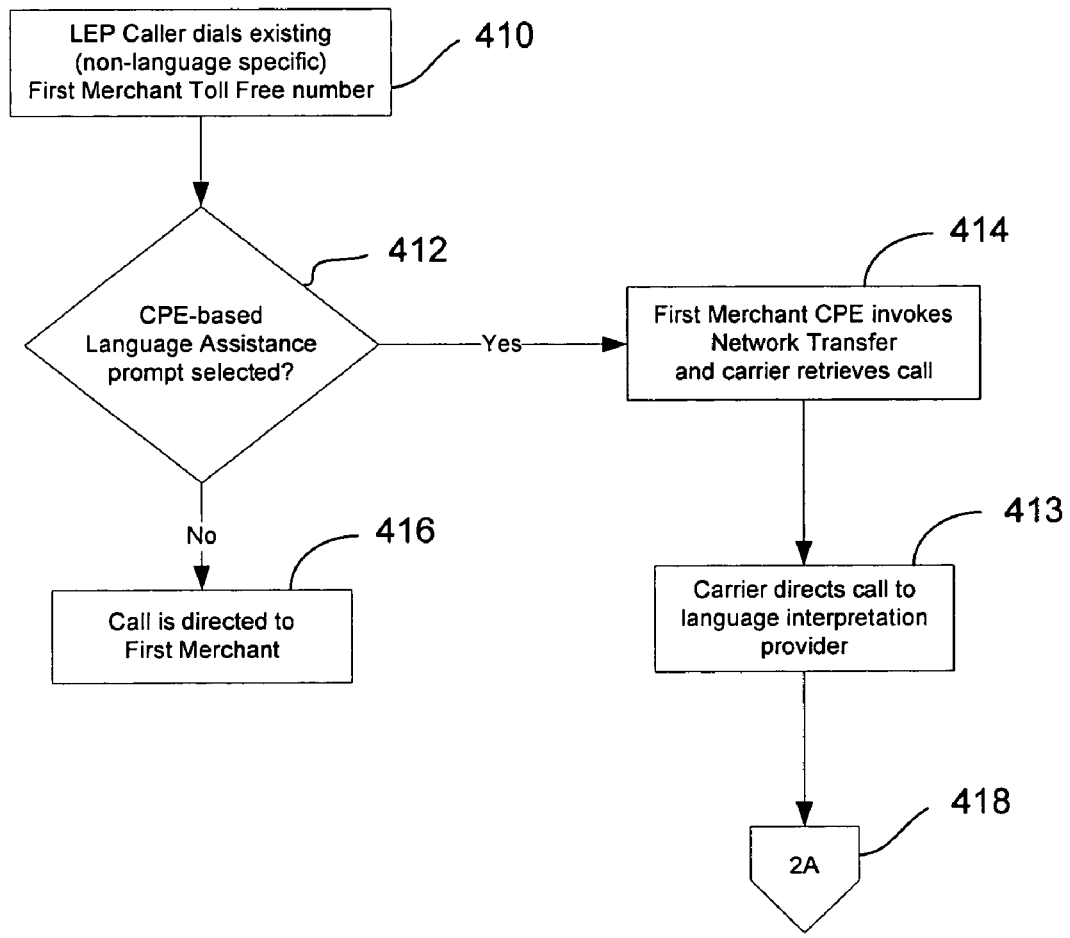
FIG. 4 illustrates a call flow diagram wherein the customer calls a first merchant's non-language-specific telephone number and a CPE-based prompting is utilized.

FIG. 4 illustrates a call flow diagram wherein the customer calls a first merchant's 130 non-language-specific telephone number and a CPE-based prompting is utilized. In one embodiment at process block 410 the LEP caller 122 dials existing toll-free numbers associated with the first merchant 130. The toll-free number can be a non-language specific number meaning that when the LEP caller 122 dials the toll-free number, no language interpretation services will be provided. Customer representatives for the first merchant 130 can be prepared to relay information to the caller in the primary language of the first merchant 130. At process block 410, the call is processed and received through the public switched network 110. The public switched network 110 can route the call directly to a private branch exchange 132 at the first merchant 130.

In one embodiment, the call from the LEP caller 122 is processed at the interactive voice response system 156 at the first merchant 130. The interactive voice response system 156 is part of what the carrier 120 can consider to be "customer provided equipment" (CPE). Thus, the carrier's 120 customer, being the first merchant 130, provides the equipment such as the interactive voice response system 156 among other systems. As such CPE refers to equipment provided by the first merchant 130.

The interactive voice response system 156 can prompt the LEP caller 122 to indicate whether language assistance is required. If language assistance is required, then in decision block 412, the CPE-based language assistance prompt, which works in tandem and connected to the interactive voice response system 156, can route the call either to a representative of the first merchant 130 agent or back to the carrier 120 so that the call can be routed to the language interpretation provider 100. The CPE-based language assistance prompt is a service generally provided by telecommunications carriers such as AT&T, MCI or Sprint that allows a phone call to be routed to the businesses private branch exchange 132 and the business sends signals back to the carrier 120 so that the call is routed back to the carrier 120. The business CPE technology determines whether the call should be routed back to the carrier 120 or received at the first merchant 130.

In one embodiment, this decision is made through the interactive voice response system 156 which permits the LEP caller 122 to indicate whether assistance is required. The phone call is retrieved from the PBX 132 at the first merchant 130. The carrier 120 can then reroute the call to the language interpretation provider 100. In effect, the inbound call to the first merchant's 130 private branch exchange 132 is released when the phone call is transferred.

For example, if an incoming phone call is received at the private branch exchange 132 of the first merchant 130 and the CPE-based language assistance prompt determines that phone call has to be ultimately relayed to the language interpretation provider 100, the interactive voice response system 156 in conjunction with the CPE dials a specific dial sequence or signals the carrier 120. Upon receiving signals that the carrier 120 recognizes as call redirection, the carrier 120 retrieves the call from the private branch exchange 132 releasing the call to the first merchant 130. Without the user of CPE-based language assistance, the incoming call to the first merchant 130 and the second leg of the incoming call to the language interpretation provider 100 remain open. This two-hop process is not necessary if a CPE-based language assistance prompt is utilized in conjunction with the network transfer feature, because the first leg is released and one leg of the call is maintained. Thus when the phone call is received by the first merchant 130 using the CPE-based language assistance prompt, if the phone call is to be rerouted to the language interpretation provider 100, the incoming leg of the phone call to the first merchant 130 is released. The CPE-based language prompt at the first merchant 130 can signal back to the carrier 120 a configured and predetermined signal such that the leg of communication between the carrier 120 and the first merchant 130 is released. Then the carrier 120 establishes a new leg routing from the carrier 120 to the language interpretation provider 100.

New leg routing provides cost savings to the first merchant 130 because the first merchant 130 does not have to be engaged in the communication, freeing up incoming lines to the first merchant 130 and reducing the number of lines that are unnecessarily occupied. Thus, the first merchant 130 can reduce costs because the first merchant 130 no longer has to have an open line to the carrier 120 and a second leg of an open line connected to the language interpretation provider 100. Rather, the first merchant 130 pays for one single connection line from the carrier 120 to the language interpretation provider 100 and also for the interpretation services.

In process block 416, if the LEP caller 122 chooses not have the call redirected to the language interpretation provider, then the call is directly directed to the first merchant 130. This is the general process for most English-speaking customers who call a first merchant 130 and do not require any language interpretation assistance. In process block 414, however, if the LEP caller 122 requires language interpretation and assistance, then the first merchant 130 utilizes the CPE to invoke a network transfer and direct the call to the carrier 120. In process block 412, the carrier 120 directs the call to the language interpretation provider 100. Then at process counter 418, the call is serviced as described in FIG. 2, in process block 206.

Figure 5:
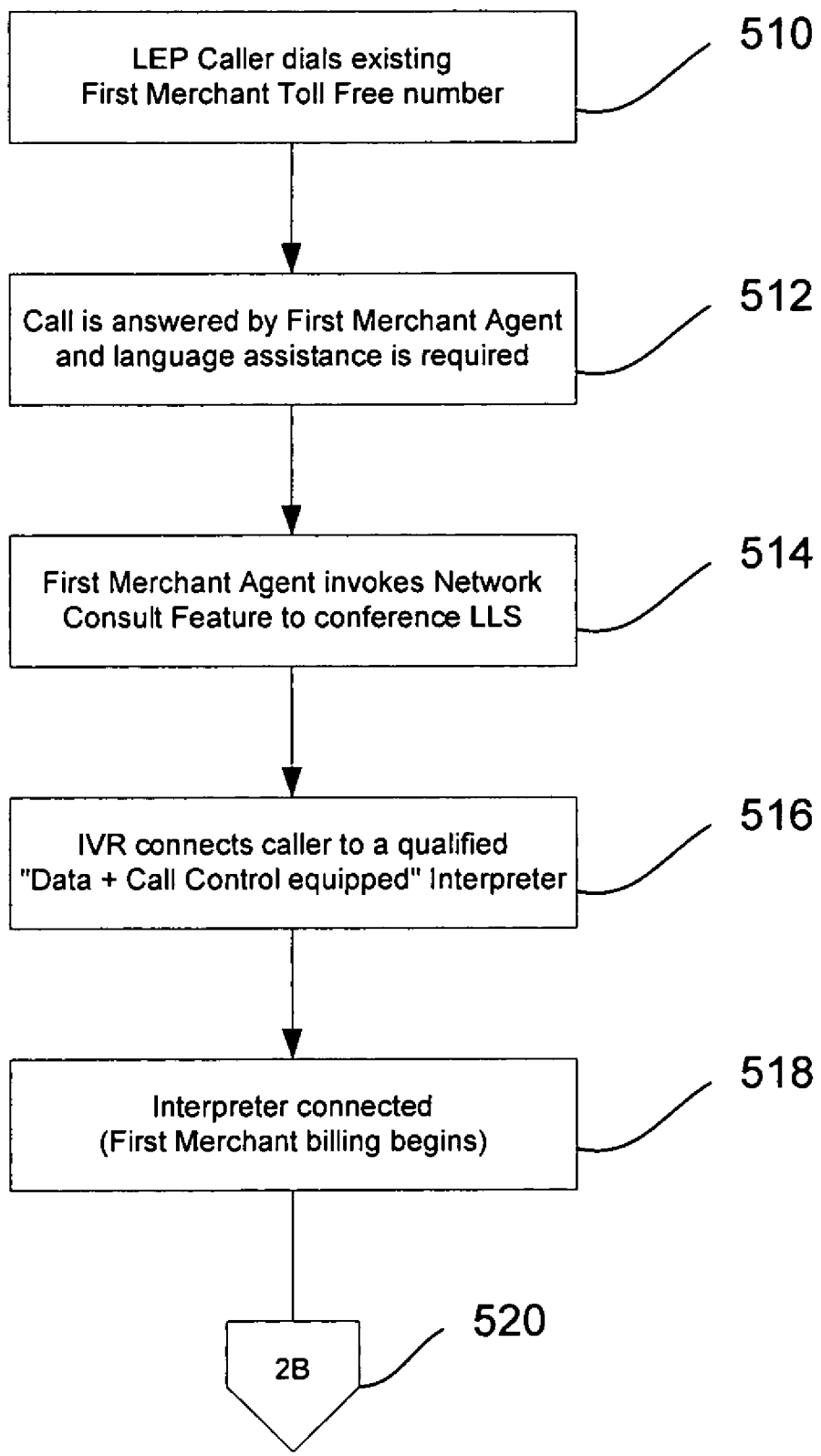
FIG. 5 illustrates a call flow diagram wherein the customer calls a first merchant's non-language-specific telephone number and a first merchant's agent connects an interpreter utilizing a carrier consult feature.

FIG. 5 illustrates a call flow diagram wherein the customer calls a first merchant's non-language-specific telephone number and a first merchant's agent connects an interpreter utilizing a carrier consult feature. In process block 510, the LEP caller 122 dials a first merchant 130 toll-free number which then in process block 512 is answered by the first merchant's 130 agent. The first merchant 130 agent is asked whether language assistance is needed.

In one embodiment, the language assistance is not prompted through an interactive voice response system 156 or a similar automated system, but rather is answered by a human response and dialed directly by a first merchant's 130 agent into the correct destination. Therefore, in process block 514, a first merchant 130 agent invokes the network consult feature to conference with the language interpretation provider 100. The agent of the first merchant 130 can be trained to prompt a correct sequence of digits configured to reroute the phone call utilizing the network transfer feature of the carrier 120. Much like a CPE-based rerouting, the agent manually inputs the necessary digits so as to create a signal recognized by the carrier 120. The agent can input the correct combination of signals either through a computer system or any other electronic device capable of transmitting touchtone signals that the carrier 120. A typical device is a touchtone telephone (DTMF touchtone). Upon receive of the touchtone signals, the carrier 120 connects the call to the language interpretation provider 100. As such, the network consult feature is used by a human operator instead of the CPE-based rerouting service. In order to provide this service, the first merchant 130 can subscribe to a network transfer feature provided by the carrier 120. Such network consult feature is generally provided by telecommunication carriers such as AT&T, MCI, and Sprint.

In one embodiment, after the call is rerouted to the language interpretation provider 100, the call is received at the primary private branch exchange 150 of the language interpretation provider 100. The interactive voice response system 156 of the language interpretation provider 100 connects the LEP caller 122 to a qualified interpreter 101. The qualified interpreter 101 can have for example a data and call control equipment that can allow the interpreter 101 to receive data text, voice data, and other useful information that the interpreter 101 cannot otherwise be able to get through a regular telephone equipment. Next, at process block 518, once the interpreter 101 has been connected, the first merchant 130 billing starts. The first merchant 130 billing starts at the point where interpretation services are provided through a qualified interpreter 101 to the LEP caller 122.

At connection block 520, the business transaction between the first merchant 130 and the calling party, in this case the LEP caller 122 can be conducted according to the process described in process block 214 of FIG. 2.

Although certain illustrative embodiments and methods have been disclosed herein, it can be apparent form the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

What is claimed is:

1. A method of providing language interpretation for a merchant during a telephone call, comprising:

receiving a telephone call at a language interpretation service provider from a customer speaking a first language, the customer being greeted in the first language by an interpreter associated with the language interpretation service provider, the telephone call being relayed to the language interpretation service provider by configuring an automated system to dial a signal to the carrier so that the telephone call connection to the merchant is released, the carrier routing the telephone call to the language interpretation service provider;

providing the interpreter with equipment to receive voice and data information related to the customer;

permitting the interpreter to telephonically engage a first agent representing the merchant, wherein the first agent speaks a second language and the interpreter translates a first conversation between the customer and the first agent; and if the customer elects to be connected to a business partner of the merchant, permitting the interpreter to telephonically engage a second agent representing the business partner, wherein the second agent speaks the second language and the interpreter translates a second conversation between the customer and the second agent.

* * * * *